2,973,131
BAG FOR SAMPLING MILK AND THE LIKE

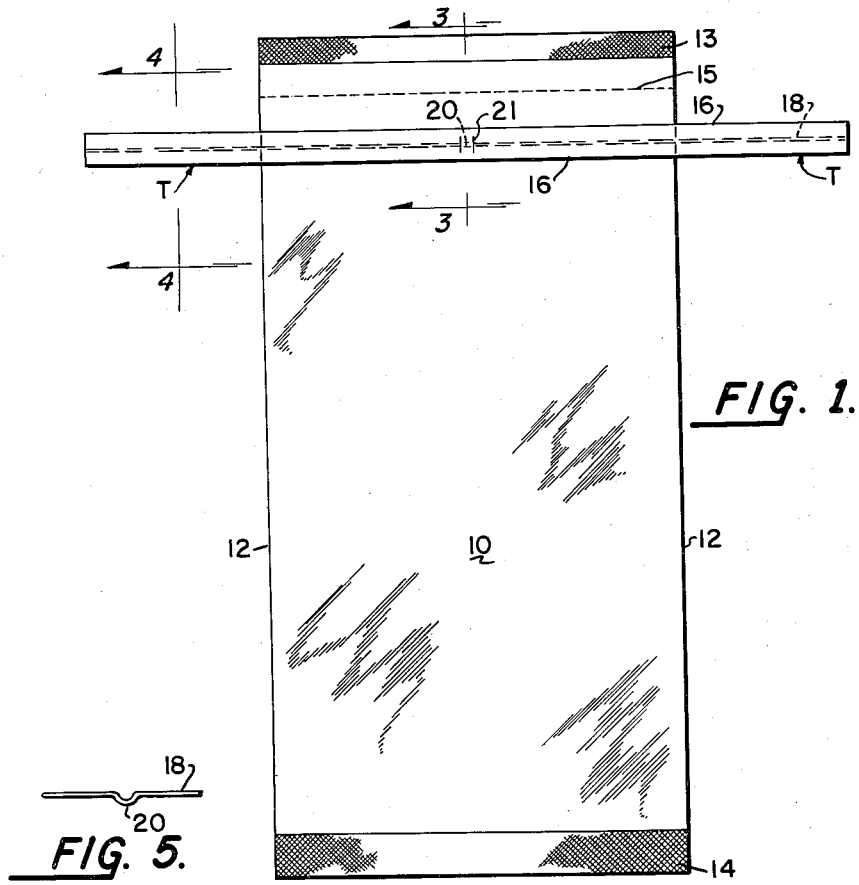
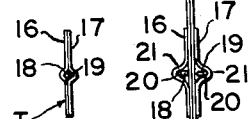
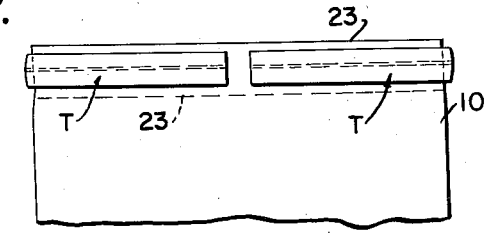
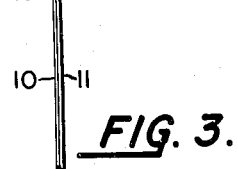
INVENTORS.
HARRY A. MEAD
LAMONT SLAGEL
ATTORNEY Feb. 28, 1961     H. A. MEAD ET AL     2,973,131
BAG FOR SAMPLING MILK AND THE LIKE
Filed May 26, 1958     2 Sheets-Sheet 2
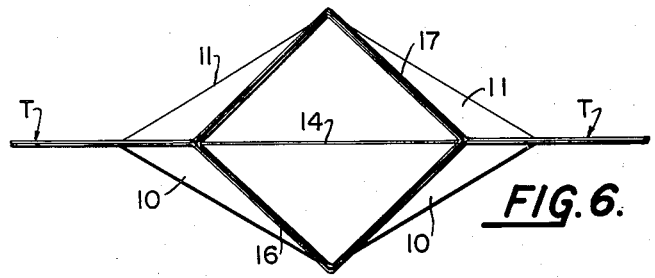
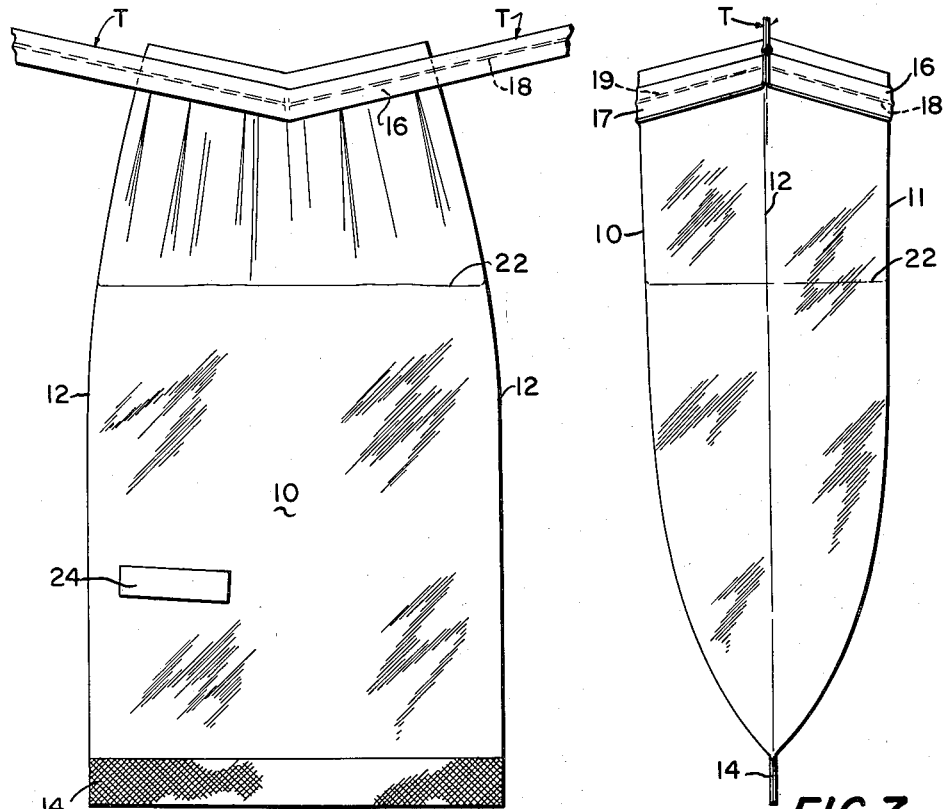
INVENTORS.
HARRY A. MEAD
BY LAMONT SLAGEL
ATTORNEY

Harry A. Mead, Lakewood, and Lamont Slagel, Denver, Colo., assignors, by mesne assignments, to National Agricultural Supply Company, Fort Atkinson, Wis., a corporation of Wisconsin Filed May 26, 1958, Ser. No. 737,581

9 Claims. (Cl. 229—66)

This invention relates to bags for liquid such as milk and more particularly to bags which may be utilized in securing samples of milk and the like, as for test purposes.

Previously, glass bottles have been used in taking milk samples for use in determining butter fat content, bacteria count, flavor and odor characteristics, as well as other tests. However, glass bottles require washing and sterilization, while it is necessary also to sterilize and wash the pipettes, ordinarily used in transferring the milk from the cooling tank to the sample bottle. The samples are ordinarily taken by the driver of the transport tank in which the milk is carried to the producer and the cases in which the sample bottles and pipettes are contained are bulky and cumbersome to handle. Also, the expense involved in washing and sterilization, as well as the difficulties involved in taking the samples and carrying the sample bottles, has been such that many drivers collect samples much less often than necessary, such as only once a month. When the samples are collected only once a month, the collection will ordinarily be made at about the same time each month, so that the operator of the milk farm knows about when the samples are to be taken and is thus much more careful with his milk on the day or days on which samples are likely to be taken. However, if samples could be taken any day with ease and convenience, the operator of the milk farm would not know when the samples are to be taken or tested and would thus be "kept on his toes," as it were, throughout the entire period. In order to take samples daily, the container for the samples should be less expensive than glass bottles and also should not require expensive and time consuming operations, such as washing and sterilization for reuse. In addition, the sampling operation should be made as simple as possible for the driver, while the sample bottles themselves should be light in weight and readily handled.

Among the objects of the present invention are to provide a bag for milk or other liquids, particularly adapted to be used in taking samples; to provide such a bag which is relatively light in weight and readily handled; to provide such a bag which is sufficiently inexpensive that it may be used once and then discarded; to provide such a bag which will remain in sterile condition until used; to provide such a bag which may be readily opened for placing a sample therein; to provide such a bag which may be readily closed after the sample has been placed therein; to provide such a bag which is readily stored and handled; to provide such a bag which will be effective in use; and to provide such a bag which may be manufactured simply and economically.

Additional objects and the novel features of this invention will become apparent from the description which follows, taken in connection with the accompanying drawings, in which:

Fig. 1 is a front elevation of a bag constructed in accordance with this invention, particularly adapted to be utilized in taking samples of milk and the like;

Fig. 2 is a top plan view of the bag of Fig. 1;

Fig. 3 is a fragmentary vertical section, on an enlarged scale, taken along line 3—3 of Fig. 1;

Fig. 4 is a vertical section, on an enlarged scale, taken along line 4—4 of Fig. 1;

Fig. 5 is a fragmentary top plan view of the central portion of a deformable member utilized in the bag of Fig. 1;

Fig. 6 is a top plan view of the bag of Fig. 1, when open preparatory to placing a sample of liquid therein;

Fig. 7 is a side elevation of the bag of Fig. 6, after a sample of milk or the like has been placed therein;

Fig. 8 is a front elevation of the bag of Fig. 6;

Fig. 9 is a top plan view of the bag of Figs. 7 and 8, after closing; and

Fig. 10 is a fragmentary rear elevation of the upper portion of the closed bag of Fig. 9.

A bag constructed in accordance with this invention and particularly adapted to be utilized in taking milk samples and the like may, as in Figs. 1, 2 and 3, include imperforate front and rear walls 10 and 11 connected at edges 12 and is preferably formed of a suitable flexible material, such as plastic, which is sufficiently inexpensive that the bag may be discarded after one use. The bag is conveniently formed from a flat strip of tubular material, such as extruded polyethylene, closed at the top by a transverse heat seal 13 and at the botom by a transverse heat seal 14. Conveniently, the heat seal 13 of one bag is formed simultaneously with the heat seal 14 of the adjacent bag, while the flattened tube is still in strip form, then severed so as to provide heat seal 13 for one bag and heat seal 14 for the next bag. Since flattened strips of tubular, extruded polyethylene are subjected to considerable heat when being formed, the strips are sterile on the inside when received from the manufacturer, while the production of the heat seals does not, of course, affect such sterility.

The bag of this invention may also be provided with a series of cuts 15, immediately below the upper heat seal 13, so that the upper heat seal 13 may be removed, to permit the top of the bag to be opened when ready for use. Although the cuts 15 preferably extend through both walls 10 and 11, the walls tend to adhere together, so that the cuts 15 do not affect the sterility of the inside of the bag. The series of cuts 15 may be produced by a blade having spaced cutting edges corresponding to the cuts or by a wheel or roller having spaced cutting edges, the former being moved against the strip and the latter moved across the strip, either when a heat seal is being produced, or afterward. Thus, the strip may be fed stepwise between reciprocating heat sealing dies, then past a reciprocating cutting blade, for producing the cuts 15 and a reciprocating cutting blade for separating individual bags, as in the manner disclosed in our copending application Serial No. 721,961, filed March 17, 1958. Or, the cuts 15 and a series of cutting blades for severing carrying a series of heat sealing dies spaced apart circumferentially in accordance with the desired distance between the heat seals on the strip, then between another pair of rolls, one of which may be provided with a series of circumferentially spaced cutting blades for making the cuts 15 and a series of cutting blades for severing individual bags from the strip and the other of which may be provided with cooperating cutting blades or backing blocks adapted to cooperate with the cutting blades of the first roll.

In further accordance with this invention, the bag is provided with opening and closing means, by which the upper end of the bag is adapted to be held open, as in Figs. 5–7, while a sample of milk or the like is placed therein, such means being pushed together from opposite sides for opening the bag, then pulled from opposite sides to bring the front and rear walls of the bag together at the top, after the desired sample has been placed therein. Such opening and closing means may also be utilized in rolling the upper end of the bag onto itself several times, and then utilized in securing the upper end of the bag in closed position. Thus, such means may include a laterally extending tab T at each side, which tabs may be utilized in the manner described below and also folded over against the rolled upper end of the bag, as in Figs. 8 and 9, to maintain the upper end of the bag closed. Such opening and closing means may include a pair of strips 16 and 17, respectively extending transversely across the front wall and rear wall of the bag just below the series of cuts 15 and laterally to each side and adhered together to form the tabs T. The strips 16 and 17 are conveniently strips of a pressure sensitive tape, formed of plastic and provided with an adhesive surface of a conventional nature, so that the strips 16 and 17 will adhere to the front wall 10 and rear wall 11 of the bag, respectively. Since the adhesive surfaces are facing each other, the strips will adhere together at the tabs T. In addition, a deformable member is placed preferably on both sides of the bag and held in position by the strips 16 and 17. Such deformable members may be soft iron wires of small diameter, such as wires 18 and 19 of Figs. 3 and 4, preferably disposed opposite each other against the front and rear walls of the bag, as in Fig. 3, but disposed together along the tabs T, as in Fig. 4. It will be understood, of course, that the deformable members may be made of other suitable material. Each deformable member, such as wires 18 and 19, may be provided at or adjacent the center with a kink or dimple 20, as in Fig. 5, which extends outwardly and thereby produces a bulge 21 in each strip 16 and 17, as in Figs. 1 and 2, the function of the kink or dimple 20 being described below. The strips 16 and 17 may be fed from rolls simultaneously with the wires 18 and 19, above and below the strip or bag, a series of spaced kinks or dimples 20 conveniently being produced in each wire prior to its being fed between the respective strip 16 or 17 and the bag or strip. The strips may then be pressed together and against the bag, then the strips and wires severed at the end of one of the tabs T. The strips and deformable members may be applied to the bags individually, as in an automatic machine, or applied to the strip before the individual bags are separated therefrom. Due to the inexpensive material of which the bags are made and the fact that the bags can be made in automatic machinery, the cost of production thereof will be sufficiently low that each bag may be used only once and then discarded.

As indicated previously, when the bag is ready for use, the upper end thereof is removed, along the line of cuts 15. Then, the tabs T are pushed toward each other from opposite sides, the deformable members, such as wires 18 and 19, providing sufficient stability to the tabs, so that the upper end of the bag will be pushed open, as to the position of Fig. 5. As will be evident, due to the tabs T being pushed toward each other, each deformable member will be moved outwardly between the tabs T and due to the center kink or dimple 20 in each wire, will "break" and thereby bend at the center to produce a generally diamond shaped configuration, as shown. When so formed, the deformable members will retain the upper end of the bag open during filling. It will be noted that the opposite walls of a flat strip of tubular extruded polyethylene or the like tend to adhere together and are difficult to separate at a transverse cut, but that with the strips 16 and 17 adhering thereto, the walls at the upper end of the bag will be readily separated with movement of the deformable members apart. As in Figs. 6 and 7, milk 22 or other liquid may be poured into the open upper end of the bag and will distend the bag, as in the manner indicated. As will be evident, the heat seal 14 at the lower end of the bag will maintain the lower end closed at all times. The bag may be of such a size that the liquid 22 contained in the bag will be a suitable quantity, such as 2 or 3 ounces, but such that sufficient space is left above the level of the liquid 22 for the closing operation.

After the desired quantity of liquid, such as milk, is placed in the bag, the tabs T may be grasped and pulled outwardly, i.e., away from each other in opposite directions, so that the deformable members will be pulled together, thus bringing the walls 10 and 11 of the bag together at the upper end. If the central portion at the top of the bag is not completely closed, the deformable members may be pressed together between the thumb and forefinger of one hand. Then, by turning the tabs T, the upper end of the bag may be rolled down onto the strips 16 and 17 and onto itself several times, as in Figs. 8 and 9, to form a flattened spiral roll 23. Then, the tabs T may be bent over toward the center to clamp the upper end of the bag closed. When the sample is to be removed from the bag, the tabs T may be readily moved outwardly and the upper end of the bag unrolled, after which the sample may be poured out or removed in any other suitable manner. Before the sample is taken, the name or code designation of the milk farm operator may be written on one of the strips 16 or 17, or on a special writing strip, such as strip 24 of Fig. 7. Strip 24 may be provided with an adhesive surface on the underside, which will adhere to the bag, and a surface on the outside which will readily take pencil or ink writing. If desired, the bag may be formed from a single strip of suitable plastic, such as polyethylene, the edges of which are moved over to the center in overlapping relation and then attached together by a heat seal, so as to form a tubular strip from a single strip, which then may be processed in the manner previously described.

A convenient manner in which the bags may be utilized is to provide a light carrying kit, such as a carrying case of light material, such as plastic, preferably having a sufficiently high insulating value, or separately insulated, and also having a series of chambers or apertures for holding a number of sample bags and a compartment for refrigerant, such as Dry Ice. Conveniently, a stainless steel dipper, such as having a capacity of 2 ounces, may be kept in the cooling tank at each milk farm and sterilized each time a sample is taken, as by immersion in a chlorine solution. The refrigerant will maintain the contents of the bag sufficiently cool during transportation, while the filled bag should be placed in a refrigerator upon reaching the milk plant. Since the lower end of each bag is closed by heat seal 14 and the upper end is closed by the clamping effect of the deformable members on the several layers rolled onto each other, at the top of the bag, the bags may be shaken in the same manner as glass bottles, preparatory to withdrawing samples needed for butterfat tests, bacteria counts and the like. The milk plant may make such tests periodically, but without notifying the tank truck driver of when tests are to be made. Thus, samples may be collected more often without undue expense or inconvenience. A health department or other control agency need only notify the milk plant on the day samples are wished. As will be evident, since the bags may be thrown away after being used once, the laboratory need not be cluttered up with washed and unwashed bottles.

From the foregoing, it will be evident that a bag of this invention, particularly adapted to be utilized in taking milk samples and the like, fulfills to a marked degree the requirements and objects hereinbefore set forth. The bag is formed of relatively inexpensive material, so that it may be discarded after one use. Also, the bag will remain in sterile condition until the sample is placed therein. Both ends of the bag are closed by heat seals, prior to use, and after the heat seal at the top of the bag has been removed, the upper end of the bag may be readily opened, merely by pressing the tabs inwardly toward each other, since the deformable members associated with the adhesive strips will be maintained in any position in which placed. The outwardly extending kink or dimple at or adjacent the center of each deformable member will cause the deformable member to bend at the center and permit the walls of the bag to be moved apart more readily at the center and form an opening convenient for pouring a sample of milk or the like into the bag. The bag is readily closed merely by pulling in opposite directions on the tabs, and the tabs readily clamp the rolled upper end of the bag when closed. The bags may also be produced in automatic machinery, so that production will be economical.

Although a preferred embodiment of this invention has been illustrated and described and certain alternatives indicated, it will be understood that other embodiments may exist and other changes and variations may be made, all without departing from the spirit and scope of this invention.

What is claimed is:

1. A bag for liquid, comprising front and rear walls connected at the side edges and closed at the bottom, said walls being formed of flexible material; and opening and closing means extending transversely of said bag adjacent the top thereof, said opening and closing means providing a laterally extending tab at each side and including a deformable member extending across each of the front and rear walls, each said deformable member being provided adjacent the center of said bag with a kink extending outwardly with respect to the corresponding wall of said bag.

2. A bag as defined in claim 1, wherein said deformable members are formed of a material having the properties of soft iron, in being deformable and tending to maintain any configuration in which placed.

3. A bag as defined in claim 2, wherein said deformable members are wires.

4. A bag for liquid having front and rear walls connected at the side edges and formed of a flexible, heat sealable material; a heat seal extending transversely of and closing the bottom of said bag; a heat seal extending transversely of and closing the top of said bag; a pair of strips of flexible material provided with an adhesive surface disposed in opposed relation and extending transversely in spaced relation to the heat seal at the top of said bag, one of said strips adhering to the front wall of said bag and the other to the rear wall of said bag, each said strip extending laterally beyond each side edge of said bag to form a tab at each side and adhering to the opposite strip along each said tab; a pair of wire-like deformable members, each formed of a material having the properties of soft iron in being deformable and tending to stay in any configuration in which placed, one of said deformable members being disposed between said one strip and the front wall of said bag and the other said deformable member being disposed between the other said strip and the rear wall of said bag, each of said deformable members being provided adjacent the center of said bag with a kink extending outwardly with respect to the corresponding side wall of said bag and also extending laterally beyond each side of said bag and being disposed between said strips at said tabs; and a series of apertures extending transversely of said bag between said strips and said top heat seal, said apertures permitting the upper end of said bag to be removed by tearing along said apertures.

5. A bag as defined in claim 4, wherein said front and rear wall and side edges of said bag are integral and formed by a flat tubular strip of polyethylene.

6. A bag for liquid, comprising front and rear walls connected at the side edges and closed at the bottom, said walls being formed of flexible material; and opening and closing means extending transversely of said bag adjacent the top thereof, said opening and closing means providing a laterally extending tab at each side and including a deformable member extending across each of the front and rear walls, a pair of strips of flexible material each having an adhesive surface on one side adhered to the respective front and rear walls of said bag, said strips being disposed in opposed relation and adhered together over the area of said tabs with the deformable members therebetween, said deformable members being formed of a material tending to maintain any configuration in which placed and thereby being adapted to hold the top of said bag open, and said strips being sufficiently flexible to permit said deformable members to hold the top of said bag open.

7. A bag for liquid, comprising front and rear walls connected at the side edges and formed of flexible, heat sealable material; a heat seal closing the bottom of said bag; a heat seal closing the top of said bag; opening and closing means extending transversely of said bag adjacent the top thereof, said opening and closing means providing a laterally extending tab at each side and including a deformable member extending across each of the front and rear walls and a pair of strips of flexible material each having an adhesive surface on one side adhered to the respective front and rear walls of said bag, said strips being disposed in opposed relation and adhered together over the area of said tabs with the deformable members therebetween, said deformable members being formed of a material tending to maintain any configuration in which placed and thereby being adapted to hold the top of said bag open and said strips being sufficiently flexible to permit said deformable members to hold the top of said bag open; and a series of cuts extending transversely of said bag between said opening and closing means and said heat seal at the top of said bag.

8. A bag for liquid, comprising front and rear walls closed along the bottom, top and side edges, said walls being formed of flexible material; opening and closing means extending transversely of said bag adjacent the top thereof, said opening and closing means providing a laterally extending tab at each side and including a deformable member extending across each of the front and rear walls and a pair of strips of flexible material each having an adhesive surface on one side adhered to the respective front and rear walls of said bag, said strips being disposed in opposed relation and adhered together over the area of said tabs with the deformable members therebetween, said deformable members being formed of a material tending to maintain any configuration in which placed and thereby being adapted to hold the top of said bag open and said strips being sufficiently flexible to permit said deformable members to hold the top of said bag open; and a series of cuts extending transversely of said bag between said opening and closing means and said top edge.

9. A bag for liquid, comprising front and rear walls connected at the side edges and closed at the bottom, said walls being formed of flexible material; and opening and closing means extending transversely of said bag adjacent the top thereof, said opening and closing means providing a laterally extending tab at each side and including a deformable member extending across each of the front and rear walls, at least a portion of each of said deformable member extending transversely to the general plane of the corresponding wall of said bag, a pair of strips of flexible material each having an adhesive surface on one side adhered to the respective front and rear walls of said bag, said strips being disposed in opposed relation and adhered together over the area of said tabs with said deformable members therebetween, said deformable members being formed of a material tending to maintain any configuration in which placed and thereby being adapted to hold the top of said bag open and said strips being sufficiently flexible to permit said deformable members to hold the top of said bag open.

References Cited in the file of this patent

UNITED STATES PATENTS

| | | |
|---|---|---|
| 678,176 | Herring | July 9, 1901 |
| 686,899 | Heroux | Nov. 19, 1901 |
| 2,108,741 | Betner | Feb. 15, 1938 |
| 2,541,674 | Snyder | Feb. 13, 1951 |
| 2,635,788 | Snyder et al. | Apr. 21, 1953 |
| 2,873,905 | Denton | Feb. 17, 1957 |

FOREIGN PATENTS

| | | |
|---|---|---|
| 496,974 | Canada | Oct. 20, 1953 |
| 1,100,511 | France | Apr. 6, 1955 |